UNITED STATES PATENT OFFICE 2,669,575

DIALKYL-$\alpha,\alpha'$-DICYANO-2,5-DIALKOXY-p-BENZENEDIACRYLATES

Nicholas W. Solonen and David I. Randall, Easton, Pa., assignors to General Aniline & Film Corporation, New York, N. Y., a corporation of Delaware No Drawing. Application September 4, 1951, Serial No. 245,074

4 Claims. (Cl. 260—465)

This invention relates to dialkyl-$\alpha,\alpha'$-dicyano-2,5-dialkoxy-p-benzenediacrylates which are new dyestuffs having brilliant colors and strong fluorescent properties.

It is known that a cyanoacetic ester can be condensed with a p-dialkylaminobenzaldehyde in the presence of alcohol and a basic condensing agent to yield yellow to orange dyestuffs. Such dyestuffs are particularly valuable for dyeing cellulose acetate silks from aqueous suspensions or solutions but the dyes do not possess any fluorescent properties. The condensation of ethylcyanoacetate with terephthalaldehyde yields a product having mild fluorescent properties and little or no pigment value due to the lack of color strength.

It is an object of the present invention to provide a new class of dyestuffs which have a brilliant orange color of strongly fluorescent properties.

Other objects and advantages will appear hereinafter.

We have found that dyes having the foregoing properties and characteristics are characterized by the following general formula:

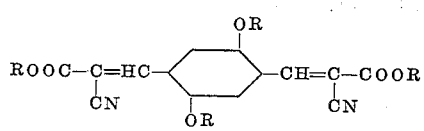

wherein the R's represent a lower alkyl group, e. g., methyl, ethyl, propyl, isopropyl, butyl, and the like.

The dyes are readily prepared by condensing one mole of 2,5-lower dialkoxyterephthalaldehyde with two moles of a cyanoacetic ester in the presence of alcohol in a small quantity of a basic condensing agent, such as pyridine. The condensation is readily carried out by first dissolving the 2,5-dialkoxyterephthalaldehyde in a sufficient quantity of absolute ethanol to form a solution followed by the addition of the cyanoacetic ester and a small quantity of piperidine or pyridine as the condensing agent. The resulting solution is gradually brought up to reflux and maintained at that temperature for a period of one hour with efficient stirring. The reaction mixture is then cooled to room temperature and the product filtered off. The press-cake is then washed with an alcohol, such as methanol or ethanol, followed by washing with water and the washed product is finally dried in a vacuum desiccator.

The dyestuffs characterized by the foregoing formula are particularly valuable in the pigment field, especially as Day-Glo colors due to their strong fluorescent properties in ultraviolet light. Both in the form of varnish drawdowns (full shade) and Beetle resin coatings, their daylight fluorescence is unusually strong. The dyestuffs have the distinct advantage of possessing good fastness to light in the form of full shade varnish drawdowns. The most unusual feature of the dyes, however, is their distinctly bright shades. It is believed that their brilliant color and strongly fluorescent properties are due to the presence of the lower dialkoxy groups in the 2- and 5-positions of the benzene nucleus.

As examples of suitable 2,5-lower dialkoxyterephthalaldehydes which may be condensed with the cyanoacetic ester, the following are illustrative:

2,5-dimethoxyterephthalaldehyde
2,5-diethoxyterephthalaldehyde
2,5-dipropoxyterephthalaldehyde
2,5-diisopropoxyterephthalaldehyde
2,5-dibutoxyterephthalaldehyde As examples of suitable cyanoacetic esters which may be condensed with the 2,5-lower dialkoxyterephthalaldehydes, the following may be mentioned:

Methylcyanoacetate
Ethylcyanoacetate
$\beta$-Hydroxyethylcyanoacetate
Propylcyanoacetate
Isopropylcyanoacetate
Butylcyanoacetate
Sec. butylcyanoacetate The invention will be further illustrated by the following specific examples, but it is to be clearly understood that they are not to be construed as being limitative. All parts given are by weight.

EXAMPLE I

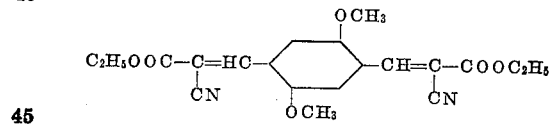

15 parts of 2,5-dimethoxyterephthalaldehyde were added to 238 parts of absolute ethanol followed by the addition of 32 parts of ethylcyanoacetate and 3.5 parts of piperidine. The resulting mixture was gradually brought up to reflux and maintained at that temperature for a period of 1 hour with efficient stirring. The reaction was then cooled to room temperature and the product filtered off. The press-cake was washed with 118 parts of methanol followed by washing with water. The product was dried in a vacuum desiccator. The dyestuff is a brilliant orange of strongly fluorescent properties and possesses good fastness to light in the form of full shade varnish drawdowns.

EXAMPLE II

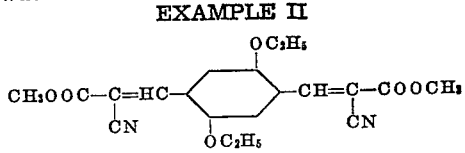

Example I was repeated with the exception that 15 parts of 2,5-dimethoxyterephthalaldehyde and 32 parts of ethylcyanoacetate were replaced by 17.2 parts of 2,5-diethoxyterephthalaldehyde and 28 parts of methylcyanoacetate. The dried dyestuff is a brilliant orange of strongly fluorescent properties and in the form of Beetle resin coatings its fluorescence is of exceptionally high intensity.

EXAMPLE III

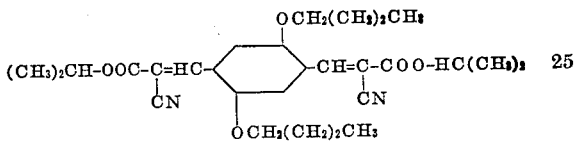

Example I was repeated with the exception that 15 parts of 2,5-dimethoxyterephthalaldehyde and 32 parts of ethylcyanoacetate were replaced by 21.5 parts of 2,5-dibutoxyterephthalaldehyde and 39.4 parts of isopropylcyanoacetate. The dried dyestuff is a very brilliant orange and possesses good fastness to light in the form of full shade varnish drawdowns.

While we have disclosed the preferred embodiments of our invention and the preferred modes of carrying the same into effect, it will be readily apparent to those skilled in this art that many variations may be made therein without departing from the spirit thereof. Accordingly, the scope of our invention is to be limited solely by the following claims.

We claim:
1. Dialkyl-$\alpha,\alpha'$-dicyano-2,5-dialkoxy-p-benzenediacrylates characterized by the following general formula:

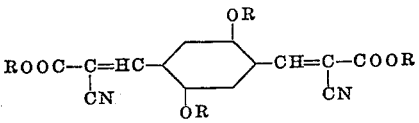

wherein the R's represent a lower alkyl group.

2. Diethyl-$\alpha,\alpha'$-dicyano-2,5-dimethoxy-p-benzenediacrylate having the following formula:

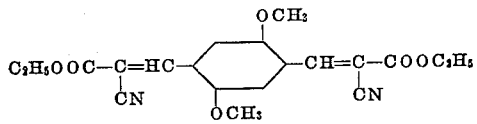

3. Dimethyl-$\alpha,\alpha'$-dicyano-2,5-diethoxy-p-benzenediacrylate having the following formula:

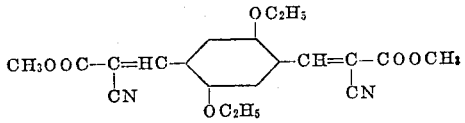

4. Di-isopropyl-$\alpha,\alpha'$-dicyano-2,5-dibutoxy-p-benzenediacrylate having the following formula:

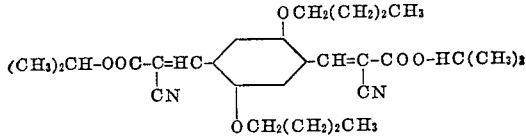

NICHOLAS W. SOLONEN.
DAVID I. RANDALL.

References Cited in the file of this patent

Fieser et al., "Organic Chem. (Heath 2nd Ed.), p. 885 (1950).

Wood et al., J. Am. Chem. Soc., vol. 72, pp. 2992–2993 (1950).

Kauffman, Ber. Deut. Chem., vol. 50, pp. 515–529 (1917).